June 26, 1962 R. W. ANDREASSON 3,040,605
DRILL
Filed Aug. 1, 1960 2 Sheets-Sheet 1
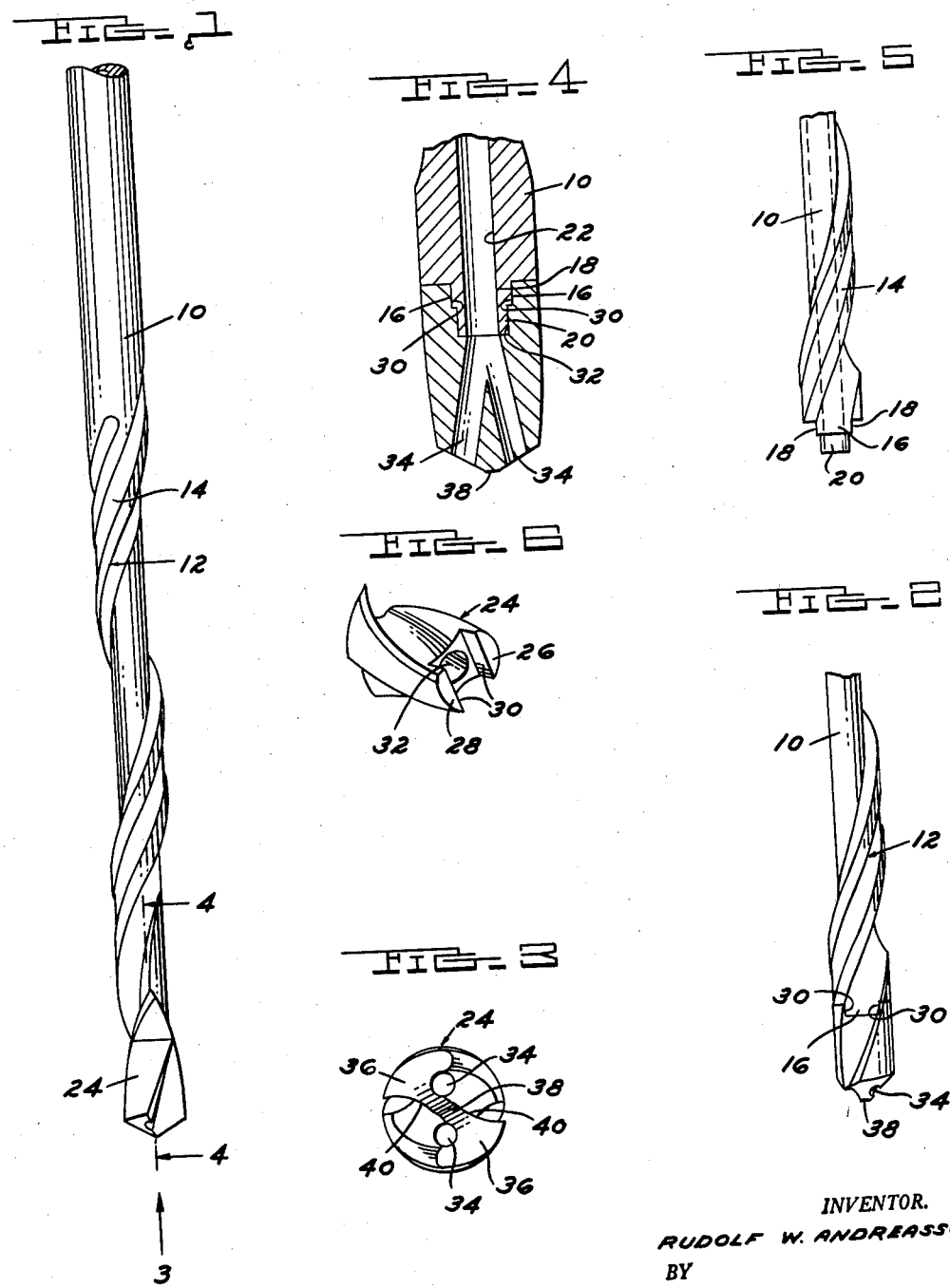
INVENTOR.
RUDOLF W. ANDREASSON
BY
Barnes, Kisselle, Raisch & Choate
ATTORNEYS June 26, 1962 R. W. ANDREASSON 3,040,605
DRILL
Filed Aug. 1, 1960 2 Sheets-Sheet 2

INVENTOR.
RUDOLF W. ANDREASSON
BY
Barnes, Kisselle, Raisch & Choate
ATTORNEYS

United States Patent Office 3,040,605
Patented June 26, 1962

3,040,605
DRILL
Rudolf W. Andreasson, P.O. Box 174, Birmingham, Mich.
Filed Aug. 1, 1960, Ser. No. 46,424
6 Claims. (Cl. 77—68)

This invention relates to a drill and has particularly to do with a drill which is adapted to the drilling of such materials as masonry, aluminum, brass and other softer metals. This application is a continuation-in-part of my co-pending application Serial No. 8,154, now abandoned, filed February 11, 1960.

With this type of drill, it is necessary to cool the cutting edges of the drill but also extremely important that ample space be provided for the outlet of chips which form very rapidly and usually in a finely divided state.

The present invention contemplates a drill which is easily formed in all sizes from the very small to extremely large and relates also to a drill which can utilize a shank which can be re-used with new tips.

With the more frequent use of induction brazing, it is no longer necessary that a brazed joint be considered a permanent joint. The present invention contemplates the use of brazing as a means for attaching and detaching what may be referred to as an expendable or throwaway tip. The construction is one which makes the parts particularly adaptable to the placement and replacement of the tip to the shank of a drill.

More specifically, the invention contemplates a drill shank with a flute formation with widely spaced lands on the shank, the working end of the drill being provided with a slot between the flute areas, one portion of the slot being shaped to register with an opening on the surface of a tip insert. This registry locates the insert for brazing and positions it properly so that internal passages of the drill and the tip will register as the parts are brazed together.

Other objects and features of the invention relating to details of construction and operation will be apparent in the following description and claims.

Figure 7:
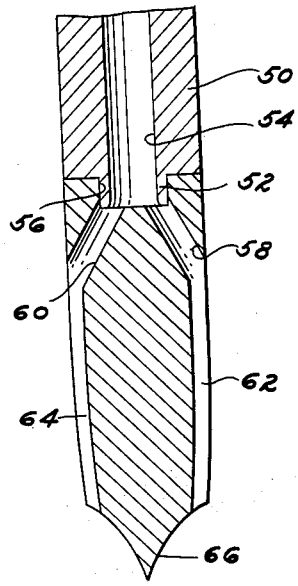
Figure 9:
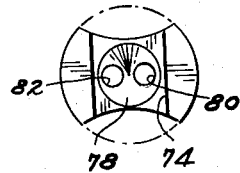
Figure 8:
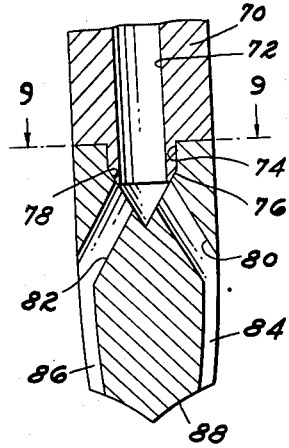
Figure 10:
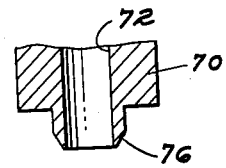

Drawings accompany the disclosure and the various views thereof may be briefly described as:

FIGURE 1, a side view of the completed drill.
FIGURE 2, a view of the drill rotated 90° from the view of FIGURE 1.
FIGURE 3, an end view of the drill tip.
FIGURE 4, a sectional view on line 4—4 of FIGURE 1.
FIGURE 5, an elevation of the drill shank with tip removed.
FIGURE 6, a perspective view of the shank end of the drill tip.
FIGURE 7, a sectional view of a completed drill showing a tip having diverging passages which reach external grooves leading to the drill tip.
FIGURE 8, a sectional view of a united shank and tip showing a tapered recess and end in the connection.
FIGURE 9, an end view of the joining end of the tip prior to assembly on line 9—9 of FIGURE 8.
FIGURE 10, a separate view of the joining end of the shank.

Referring to the drawings:

The invention may be described as a drill with a replaceable tip as distinguished from most drills today which are formed to be reground until the tip has reached the point that the entire drill must be discarded. The purpose, therefore, is to provide a design which permits the tip to be suitably positioned relative to the shank so that it can be easily attached and to provide a solid joint between the replaceable tip and the shank.

In FIGURE 1, the shank 10 is shown with a single flute 12 widely spaced on the shank having a relieved central portion 14. The end of the shank is provided with a transverse extension 16 having side shoulders 18 extending chordally across the diameter of the shank. Extending beyond the extension 16 is a circular extension 20 positioned concentrically with a central opening 22 axially of the shank.

The tip to be attached to the shank is a double fluted member 24 having at the shank end a transverse slot which creates two segmental portions 26 and 28 with inside shoulders 30. This tip may be formed of high speed steel or carbide if desired or any other hard cutting material.

A recess 32 is positioned centrally of the tip below the shoulders 30 and this opening 32 connects to two diverging holes 34 which terminate at the leading edges of two angled surfaces 36 converging toward the tip 38. The cutting edges are formed at 40 on the two sides of the angled portions 36 opposite the holes 34.

In the assembly of the device, it will be seen that the projection 20 and the projection 16 mate with the openings 32 and the shoulders 30 of the tip 24. The parts may be readily brazed together and are self-locating as is seen by the shape of the parts in the drawings by reason of the interfit of the various telescoping portions.

It will thus be seen that the tip 24 can be sharpened to a predetermined amount along the two flutes and then may be readily removed from the drill shank and remay be readily a similar drill tip. Cutting fluid is brought placed by a similar drill tip. Cutting fluid is brought through the diverging passages 34 directly to the cutting edges so that the drill is adequately cooled and lubricated at all times. In addition, there is ample room for the excessive chip flow to move out to the flute openings of the shank.

The design of the joint can also be applied to a drill tip having diverging passages from the central shank end to outer grooves extending down to the tip. In FIGURE 7 a shank 50 has a cylindrical projection 52 concentric with the internal central passage 54. The tip has a recess 56 for receiving the projection 52 and diverging from this recess are the opposed passages 58 and 60, each of which lead respectively to external side grooves 62 and 64 leading down to the cutting tip 66.

In FIGURE 8, a shank 70 has a central passage 72 and a projecting central portion 74 concentric with the passage 72, this portion having a chamfered end section 76 to be received in a conical opening 78 in the drill tip. The conical opening 78 connects with diverging passages 80 and 82 leading to side grooves 84 and 86 extending downwardly to the tip 88.

The purpose of the conical opening 78 and the chamfered end section 76 is to have a self-centering locating projection on the shank which will register with the recess in the tip without interfering with the outer walls of the web of the spiraled tip. The web in smaller drills particularly is rather thin and it is desirable that the recess in the shank end of the drill tip be such that it does not penetrate the walls of the web to weaken the structure. The shanks 50 and 70 can be of the same type as shown in FIGURE 1; and the projection portion 52 of FIGURE 7 as well as the corresponding projection of FIGURE 8 will be similar to that shown in FIGURES 4 and 5 extending transversely and diametrically across the tip end of the drill shank to form a drive connection between the shank and the drill.

It will thus be seen that the driving and locating connection between the replaceable drill tips and the shanks can be utilized for not only the tips with the internal diverging passages as in FIGURE 4 but also the tips with the external groove passages which are desired for some applications of drilling wherein the drilling fluid tends to float the drill centrally of the hole and reduce wear on the outer surfaces of the drilling tip. In addition, the design is such that the structure of FIGURES 8 to 10 can be readily adapted to very small drills, thus permitting it to be used on a wide range of drill sizes.

I claim:

1. A combination drill shank and replaceable tip which comprises a shank portion having a fluted area for chip release and a central coolant passage, the end of the shank comprising a transverse extension extending between the flutes having chordal shoulders and a tubular extension beyond said transverse extension, and a replaceable tip to be positioned on the end of said shank and bonded thereto comprising a double fluted cylindrical tip portion of cutting material having a transverse slot between the lands and a circular recess to receive the extensions on said shank in a bonded joint to carry coolant from the central passage of said shank, said recess joining with diverging coolant passages extending to the cutting edges of said tip, said tip receiving a driving force from the transverse extension on said shank and a centering position from the tubular extension on said shank, said passages merging centrally for the flow of coolant from said shank through said joint to said tip.

2. A device as defined in claim 1 in which the diverging coolant passages in the cutting tip extend through the web of the tip to surfaces directly adjacent the cutting edges of the tip.

3. A device as defined in claim 1 in which the diverging coolant passages in the cutting tip extend to outer grooves axially positioned on the drill tip extending along the sides of the tip to the cutting edges of the tip.

4. A device as defined in claim 1 in which the tubular extension beyond the transverse extension terminates in a conically chamfered end portion and the recess on the shank end of the tip is provided with a complemental conical recess to receive the chamfered section of the shank end, thus permitting the use of the connection on extremely small shank sizes without interference with the outer surfaces of the web of the drill tip.

5. A combination drill shank and replaceable tip which comprises a shank having fluted areas for release of chips and a double fluted tip having a suitable drill point ground thereon, said tip having converging passages extending from opposite sides of the drill point to a center opening at the shank end thereof, said tip and said drill shank having mating surfaces comprising an axial tubular portion on one, mating with a circular recess on the other, and a transverse portion on one, mating with the transverse recess on the other, wherein to create a centering between said parts and a driving connection between said parts when bonded together, said shank having a central passage merging with the passages in said drill tip, said mating portions and recesses forming a joint through which coolant can pass from said central passage to the said converging passages of said drill tip.

6. A combination drill shank and replaceable brazed tip which comprises a shank portion having a spiral fluted area for chip release and a central coolant passage, the end of the shang comprising a transverse extension extending across the drill terminating at the flute walls and having parallel chordal walls lying in planes parallel to the axis of the shank, said shank having a central coolant passage, and an axial tubular extension surrounding said passage projecting from said transverse extension coaxially of said shank, and a replaceable tip to be positioned on the end of said shank comprising a double fluted cylindrical tip portion of cutting material having a transverse slot between segmental land portions, said slot terminating at the flute walls, said slot having parallel side walls lying in planes parallel to the axis of the shank to interfit with the transverse extension on said shank, and a recess in the base wall of said slot concentric with the axis of said tip, said tip having divergent coolant passages extending from the bottom of said recess to the tip extermity, said recess having walls to interfit with the tubular extension of said shank to form a joint to carry coolant from said central coolant passage of said shank to said divergent coolant passages of said tip, said tip receiving a driving force from the transverse extension on said shank acting in said slot and a centering position from said tubular extension in said recess.

References Cited in the file of this patent

UNITED STATES PATENTS

| | | |
|---|---|---|
| 1,189,727 | Oakley | July 4, 1916 |
| 2,555,302 | Cogsdill | June 5, 1951 |

FOREIGN PATENTS

| | | |
|---|---|---|
| 200,708 | Germany | July 28, 1908 |